March 5, 1940. T. W. ROSEBAUGH 2,192,489
PROCESS FOR THE PURIFICATION OF ORGANIC COMPOUNDS
Filed June 6, 1938
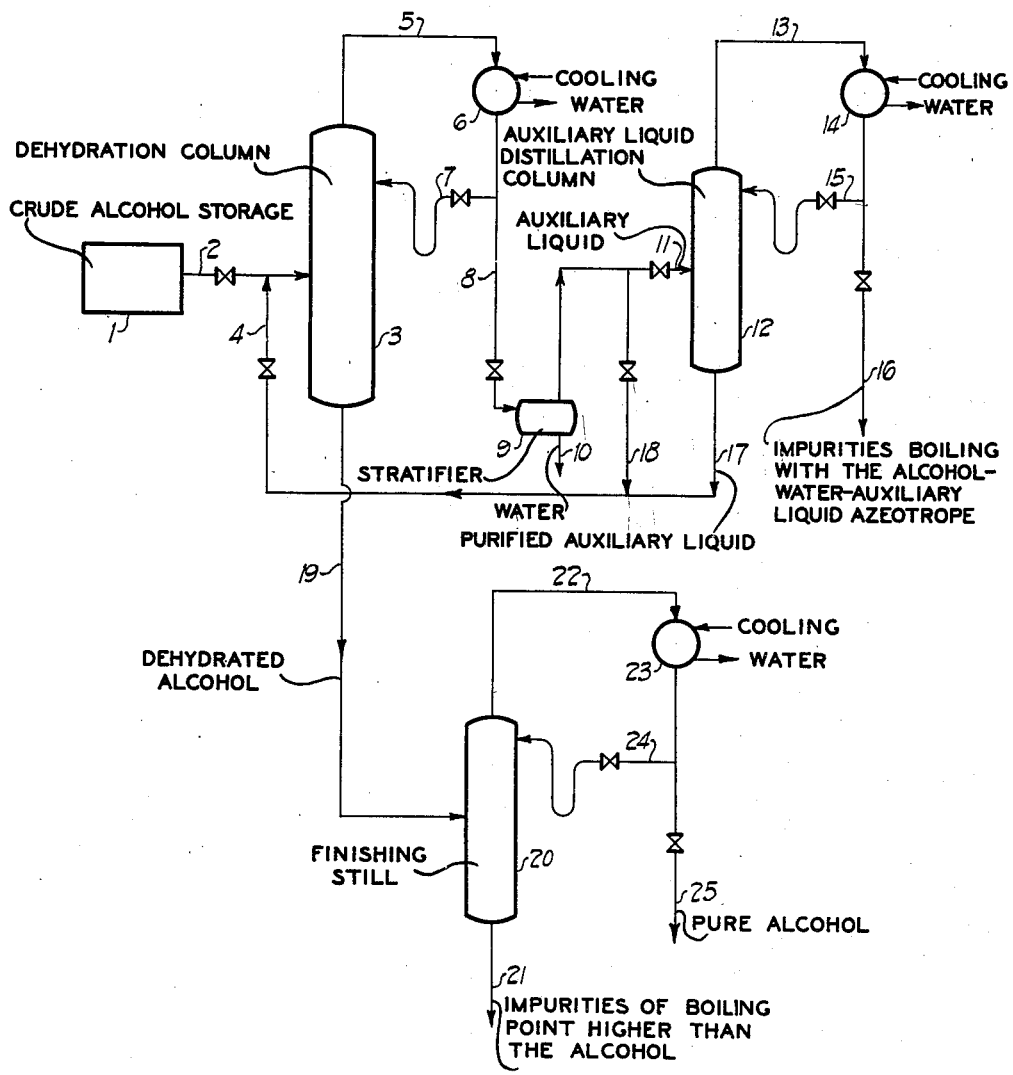
Inventor: Theodore W. Rosebaugh
By his Attorney: Arthur B Bakalar Patented Mar. 5, 1940

2,192,489

UNITED STATES PATENT OFFICE 2,192,489

PROCESS FOR THE PURIFICATION OF ORGANIC COMPOUNDS

Theodore W. Rosebaugh, Oakland, Calif., assignor to Shell Development Company, San Francisco, Calif., a corporation of Delaware Application June 6, 1938, Serial No. 212,016

7 Claims. (Cl. 202—42)

This invention relates to the separation of components of liquid mixtures and deals particularly with distillation methods for effecting such separations wherein an auxiliary liquid is used to assist in the separation. The process of the invention is especially applicable in the azeotropic purification of aqueous alcohols, esters, ketones and other organic compounds with the aid of an auxiliary liquid which is substantially immiscible with water.

One object of my invention is the more efficient use of auxiliary liquids used in the separation of components of liquid mixtures. In conformity with this objective, I use the auxiliary liquid to effect removal of other components in addition to those which are normally removed thereby.

Another object of my invention is the separation of impurities accumulated in auxiliary liquids in the course of their use whereby recontamination of the product is avoided.

Still another, and more particular object of my invention is the provision of an improved process for purifying aqueous organic compounds in which impurities may be removed from the organic compound in the same distillation in which water is separated therefrom.

For purposes of clarity, the process of my invention will be described in detail only in connection with its application to the purification of alcohols obtained from olefines, an application in which it has special advantages. It will be understood, however, that the same procedure may be applied not only to the purification of alcohols from other sources but also in the separation of components of other mixtures. Thus, for example, the purification of ethers, esters, ketones and the like derived from alcohols produced from hydrocarbons, particularly secondary and/or tertiary alcohols produced from petroleum hydrocarbons, is a field in which the process of my invention is also especially advantageous.

The preparation of alcohols of high purity from olefines, by either direct hydration of the olefines or by converting them to suitable esters such as alkyl sulfates which may be then hydrolyzed to the desired secondary or tertiary alcohol, has been recognized as difficult because of the presence in the crude products of impurities which form azeotropes with the alcohol and/or other components of the mixture which interfere with the separation of such components by distillation. Of the many suggestions which have been made for the purification of such alcohols, those employing auxiliary liquids such as benzol, xylol and the like for effecting dehydration of the alcohol as described in United States Patent 1,990,789, for example, have proven most suitable. But even in such cases, very careful repeated distillation is necessary in order to eliminate all of the impurities.

I have found that the purification process may be greatly improved and rendered much more flexible by utilizing the distillation with an auxiliary liquid to effect removal of impurities which are miscible with the auxiliary liquid. It has been proposed to redistill one or the other or both layers of the condensate formed during dehydration of aqueous alcohols and the like with auxiliary liquids. But as far as I have been able to ascertain such redistillations have been solely for the purpose of recovering alcohol from the auxiliary liquid and/or auxiliary liquid from the aqueous layer of the condensate and in all cases all of the distillation products have been returned to the system so that no elimination of impurities has been accomplished during the dehydration. In contrast to such prior art methods of operation, I redistill or otherwise suitably treat the layer of the condensate rich in auxiliary liquid, in whole or in part, to effect removal of impurities which have been taken up by the auxiliary liquid from the crude alcohol being treated. The impurities which I thus separate are removed from the system and hence no longer tend to contaminate the product. By this method of operation I not only eliminate undesirable impurities in the same step in which dehydration of the alcohol is effected but also I make the dehydration distillation smoother and easier to control through the use of auxiliary liquids of more uniform composition.

While my invention is capable of embodiment in different forms and may be carried out in different kinds of apparatus, the accompanying drawing, which is a diagrammatic representation of one assembly of apparatus which I have found to be particularly useful, illustrates an especially advantageous method of carrying out the process of my invention. In the drawing I represents a source of crude alcohol which may, for example, be the crude product obtained on flash distillation of a diluted absorption product of an olefine such as propylene in sulfuric acid or may be a distillation product such as a constant boiling mixture or the like obtained therefrom or from a hydrolysis product of normal or iso-butylenes absorbed in sulfuric acid or like crude aqueous alcoholic products. The crude alcohol containing in addition to alcohol and water, volatile impurities such as lower molecular weight polymers of olefines present in the starting material and/or ethers and the like is fed via valve controlled pipe line 2 to a dehydration column 3 after admixture with a suitable auxiliary liquid introduced in proper amount through valve controlled line 4. In the dehydration column 3 a mixture of alcohol, water and auxiliary liquid together with all impurities vaporizable at or near the boiling point of the ternary azeotrope of the alcohol, water and auxiliary liquid, are removed overhead via line 5 and condensed in condenser 6. A part of the condensate is returned, by valve controlled pipe line 7, as reflux to column 3 while the remainder is conducted by valved line 8 to stratifier 9 in which separation into a phase, usually the upper layer, rich in auxiliary liquid, and a phase which is preponderantly water takes place. The latter is withdrawn by line 10 and may be redistilled or given any other suitable treatment, not shown, for recovery of its alcohol content. The phase rich in auxiliary liquid will contain not only small amounts of alcohol and water but also such of the volatile impurities as are miscible with the auxiliary liquid used. Thus substantially all of the volatile hydrocarbon, ether and like water insoluble impurities will appear in the phase rich in auxiliary agent. I therefore conduct the phase rich in auxiliary liquid via valve controlled pipe line 11 to a distillation column 12 in which I distil off by line 13 to condenser 14 sufficient of such impurities, so that their concentration in the recycled auxiliary liquid is maintained substantially constant at a point at which purification of the alcohol is effected simultaneously with its smooth dehydration.

A part of the impurities removed from the auxiliary agent and condensed in condenser 14 are used as reflux for column 12, being introduced by valve controlled line 15 while the remainder, which in normal continuous operation after the system has reached equilibrium will be equivalent to the impurities soluble in the auxiliary liquid given up thereto by the crude alcohol in column 3, is removed from the system by valve controlled pipe line 16. The purified auxiliary liquid is withdrawn from column 12 by line 17 connecting with line 4 by which auxiliary liquid is recycled to the dehydration column. Instead of distilling all of the layer rich in auxiliary liquid in column 12 a part may be by-passed by line 18 to line 4 while a greater proportion of the impurities present in the remainder are removed in column 12 so that on remixing the purified and unpurified portions of auxiliary liquid before recycling the impurity content is at the desired low concentration.

The purified and dehydrated alcohol produced in column 3 is withdrawn as bottom product by line 19 and may be conducted to a finishing still 20 in which any remaining impurities of higher boiling point than the alcohol may be withdrawn by line 21 while substantially pure alcohol is taken off overhead by line 22 and condensed in condenser 23. A part of the condensate may be returned by line 24 as reflux for the finishing still while pure product is withdrawn through valved line 25.

Many variations in the foregoing procedure may be made without departing from the teachings of my invention. The process may be carried out intermittently or batchwise instead of continuously as described. The auxiliary liquid may be introduced at other suitable points in the dehydration column instead of with the crude alcohol and the materials fed to the various columns may be in either the liquid or vapor phase. The distillations may be carried out at atmospheric or elevated or reduced pressure as is most suitable for the particular mixtures being treated. Supplementary treatments may be included in the system for the removal of other components of the mixtures being treated if their composition makes such procedure desirable.

The auxiliary liquid chosen in any particular case will depend upon the nature of the material to be purified. Auxiliary liquids substantially immiscible with water but having a high miscibility with at least part of the impurities to be removed are preferred. For the purification of polymer containing alcohols, hydrocarbons such as benzene, toluene, xylene, hexane, and the like are suitable, as well as chlorinated hydrocarbons such as carbon tetrachloride, ethylene chloride, and the like although other halogenated compounds such as ββ'-dichlorethyl ether and the like may also be used. Depending upon the boiling point and solubility characteristics of the material being purified still other types of auxiliary liquids, such, for example, as esters, as ethyl acetate and the like, may be used. The choice of auxiliary liquid may influence the method of carrying out the distillations depending upon the relation which its boiling characteristics bear to those of the other components of the mixture under treatment. Thus, for example, in column 12 it may be more advantageous to separate the impurities as bottom products instead of as overhead as shown in the drawing. Also steam distillation may be employed in this step of the process to facilitate the separation of auxiliary liquid and impurities.

It will be evident that the process of my invention offers many advantages, particularly in efficiency and completeness of removal of impurities, compared with prior methods of separating the components of similar mixtures. The smoothness of operation resulting from the use of mixtures of constant composition such as are obtained by removal of impurities accumulating in the auxiliary liquid greatly reduces the labor involved in carrying out the dehydration and has the additional advantage of eliminating a component or components which are highly undesirable in the product. Furthermore the complete removal of such impurities in the dehydration stage makes subsequent distillation simpler and less exacting, further reducing the cost of the process.

My invention is not only capable of wide variation with respect to the mixtures which may be treated and the auxiliary liquids which may be used but also the operating details may be varied. For example, the separation of impurities from the auxiliary liquid may in certain cases be effected by suitable selective solvents. Also the impurities removed through line 16 may be suitably worked up by redistillation and/or extraction in order to recover any valuable components, such, for example, as small amounts of the alcohol being purified, which may be returned to the system or otherwise disposed of. In many cases, particularly where the impurities involved are hydrocarbon polymers and/or ethers or the like, the product recoverable from the auxiliary liquid is valuable as a motor fuel of desirable antiknock rating and/or as a solvent or the like. The process of the invention is not restricted to the purification of individual compounds such as the isopropyl, secondary and tertiary butyl alcohols and the like more specifically described in the foregoing by way of illustration, but may also be applied to the purification of mixtures of such compounds such, for example, as are obtained by hydration of olefine mixtures or by hydrogenation of oxides of carbon or oxidation of hydrocarbons or the like, or mixtures of other compounds, for example the ester or ketone mixtures obtainable of such alcohol mixtures, or the other suitable compounds.

It will therefore be clear that my invention is not to be limited to the details of operation described nor by any theory advanced in explanation of the improved results attained, but only by the terms of the accompanying claims in which it is my intention to claim all novelty inherent therein as broadly as possible in view of the prior art.

I claim as my invention:

1. In a process of purifying a crude aqueous secondary butyl alcohol containing hydrocarbon soluble impurities which distil therewith the steps of adding xylene to said crude alcohol, distilling said mixture to remove an overhead product comprising xylene, water, secondary butyl alcohol and at least a part of said impurities, condensing and stratifying said overhead product, separating the resulting xylene phase containing said impurities, distilling the separated xylene phase to remove said impurities as an overhead product which is withdrawn completely from the system and returning the resulting bottom product of substantially purified xylene to the first said distillation.

2. In a process of purifying a crude aqueous butyl alcohol containing water immiscible impurities formed in the process of producing said alcohol from the corresponding butylene, the steps of dehydrating said crude alcohol by distillation with a liquid hydrocarbon solvent for said impurities which forms an azeotrope with secondary butyl alcohol and water, separating from the distillate a hydrocarbon phase containing said impurities, redistilling the separated hydrocarbon phase to remove said impurities therefrom, returning the thus purified hydrocarbon liquid to the first said distillation and withdrawing said impurities from the system.

3. In a process of producing a pure anhydrous alcohol from the corresponding olefine the steps of distilling a crude aqueous alcohol containing hydrocarbon soluble impurity obtained as an intermediate product in the presence of a liquid hydrocarbon which forms an azeotrope with water and said alcohol in which azeotrope at least a part of said impurity appears, condensing and separating the distillate obtained into a hydrocarbon phase containing said impurity and an aqueous phase, separately distilling said hydrocarbon phase to separate said liquid hydrocarbon and said impurity, removing the separated impurity from the system and returning the thus purified hydrocarbon liquid to the first said distillation.

4. In a process of producing alcohols free from polymers from aqueous mixtures of such alcohols containing polymers, the steps of substantially reducing the aqueous content of the alcohol by azeotropic distillation with an auxiliary liquid miscible with said polymer but immiscible with water wherein at least a part of said polymers are distilled with the auxiliary liquid removing polymer from the phase of the condensate rich in said auxiliary liquid thereby obtained and returning the thus purified auxiliary liquid to said azeotropic distillation.

5. In a process of dehydrating an aqueous organic compound containing an impurity vaporizable therewith the steps of adding an auxiliary liquid miscible with said impurity but substantially immiscible with water to said compound, distilling said mixture to separate auxiliary liquid and water from the organic compound, and distilling at least a part of the separated auxiliary liquid to remove at least a part of said impurity therefrom prior to returning the auxiliary liquid to the first mentioned distillation.

6. In a process of dehydrating an aqueous organic compound containing an organic impurity which vaporizes during azeotropic dehydration of said organic compound by means of an auxiliary liquid miscible with said impurity but substantially immiscible with water the steps of distilling off said auxiliary liquid and water from the organic compound, stratifying the distillate, distilling the phase of the distillate rich in auxiliary liquid to separate said impurity therefrom and returning the purified auxiliary liquid to the first said distillation.

7. In a continuous process of purifying and dehydrating an aqueous organic compound containing impurities vaporizable therewith, the steps of continuously commingling said compound with an auxiliary liquid capable of forming an azeotrope with said compound and water, said auxiliary liquid being miscible with said organic compound and impurities but substantially immiscible with the water, continuously distilling said mixture to separate the auxiliary liquid, water and a substantial proportion of the impurities from the organic compound, separating the auxiliary liquid and the impurities from the water, distilling at least a portion of the separated auxiliary liquid and impurities mixture to remove at least a part of said impurities therefrom, and commingling said auxiliary liquid with new quantities of the crude aqueous organic compound to be treated.

THEODORE W. ROSEBAUGH.